United States Patent [19]
Roth

[11] Patent Number: 4,741,068
[45] Date of Patent: May 3, 1988

[54] WINDSHIELD WIPER ARM

[75] Inventor: Christian Roth, Bietigheim-Bissingen, Fed. Rep. of Germany

[73] Assignee: SWF Auto-Electric GmbH, Bietigheim-Bissingen, Fed. Rep. of Germany

[21] Appl. No.: 873,798

[22] Filed: Jun. 13, 1986

[30] Foreign Application Priority Data

Jun. 15, 1985 [DE] Fed. Rep. of Germany ....... 3521527

[51] Int. Cl.⁴ ............................................. B60S 1/34
[52] U.S. Cl. ................ 15/250.19; 15/250.2; 15/250.35
[58] Field of Search .......... 15/250.19, 250.15, 250.20, 15/250.34, 250.35

[56] References Cited
U.S. PATENT DOCUMENTS 2,736,053  2/1956  Oishei et al. ................ 15/250.35 X
4,370,774  2/1983  Bienert et al. ................... 15/250.2

Primary Examiner—Peter Feldman
Attorney, Agent, or Firm—James B. Raden; Robert P. Seitter

[57] ABSTRACT

A windshield wiper arm including a tension spring which acts upon a holding pin of a swivellable rocker which, upon tilting of the wiper link from its operating position to a tilted position, is abruptly changed from a first end position to a second end position. The swivelling angle of the link between the operating position and a stable tilted position is reduced.

7 Claims, 2 Drawing Sheets

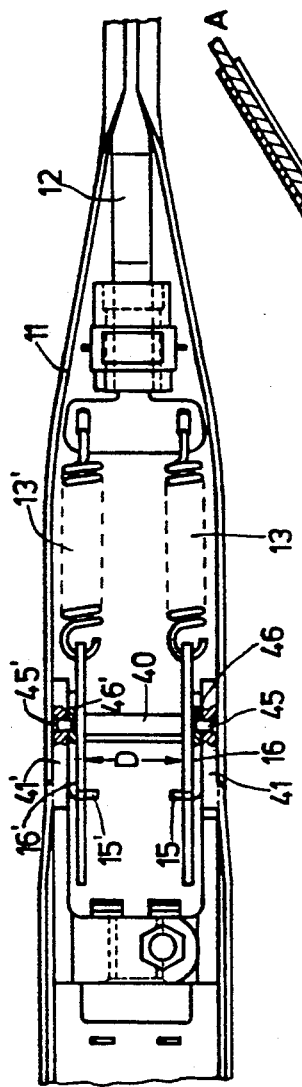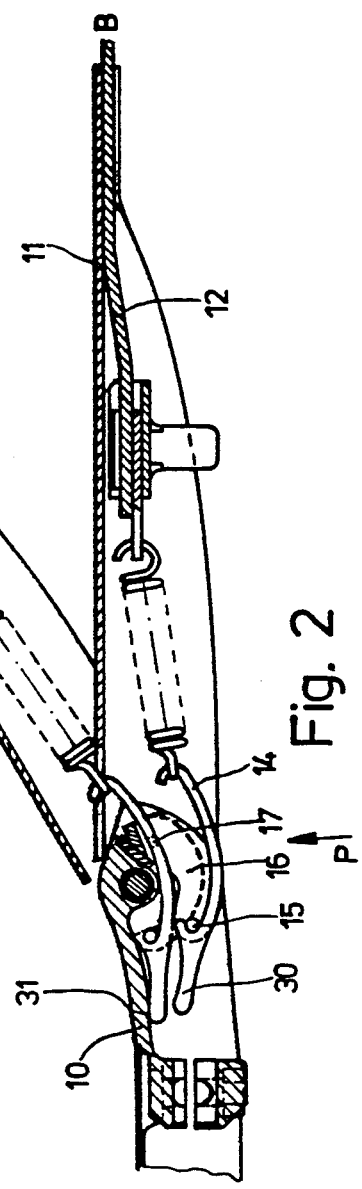

4,741,068

WINDSHIELD WIPER ARM

BACKGROUND OF THE INVENTION

The invention relates to a windshield wiper arm in which the link may be swivelled from an operating position to a tilted position.

Motor vehicles are increasingly equipped with wiper systems in which the windshield wiper is parked in a slot between the windshield and the engine hood. However, only a limited angular range is available for tilting the wiper arm from the operating position into the tilted position. Most of today's wiper arms cannot be used for windshield wiper systems of this kind, because the angular range between the operating position and the tilted position is too large. The reason is that in such wiper systems the link and the wiper rod have to be swivelled relative to the fastening member so far that the connecting line between the fixed suspension points of the tension spring on the wiper rod and on the fastening member crosses the axis between link and fastening member such that the dead center of the contact pressure spring relative to this axis is overcome.

German petty Pat. No. 1 774 020 shows a wiper arm in which, when the link is tilted, the point of application of the tension spring on the fastening member is adjusted relative to the articulated axle. The tension spring acts upon a pin which is displaceably guided in a straight longitudinal hole on the fastening member. Compared with constructions having a stationary holding pin, the required tilting angle is diminished by displacement of this pin because with a displacement of this pin the perpendicular spacing between the articulated axle between fastening member and link and the action line is reduced. However on disadvantage in this construction is that a distinct locking point cannot be felt between the operating position in which the link is drawn towards the window pane, and the tilted position in which the link is prestressed in the opposite direction. One reason is that during a first swivelling range of the link from the operating position, the holding pin initially retains its first end position until the action line of the spring element adjusted to be approximately perpendicular to the longitudinal hole. In a following swivelling range the pin is then displaced in the longitudinal hole, whereby the tension spring is only slightly tensioned. The action line of the tension spring cuts the articulated axle at exactly the time when the pin occupies its other end position. The link must be swivelled by a further amount so that the tilted position is sufficiently stable.

Although the tilting angle is limited in comparision with prior constructions having a fixed point of application of the tension spring, it nevertheless does not meet requirements for such devices. Moreover, the locking point cannot be distinctly felt. Furthermore, because of friction losses between the pin and the longitudinal hole and because of possible dirt in the longitudinal hole it can not be ensured that the pin really reaches its other end position.

SUMMARY OF THE INVENTION

The present invention is directed to providing a wiper arm in which only a small swivelling angle between the operating position and the tilted position is necessary, but in which the tilted position is nevertheless sufficiently stable so that inadvertent return motion of the link and of the wiper blade guided thereon is avoided.

The invention is thereby based on the idea that the locking point between operating position and tilted position can be clearly felt, if in a swivelling motion of the link the holding pin is abruptly changed over into its second end position, wherein this end position is selected in such that the action line of the spring element is moved form one side of the articulated axle to the other side. Thus in this construction there is a defined swivelling angle in which the holding pin is abruptly changed over by the force of the spring element. Thereby the tilted position is reached at the same time, because the action line of the spring element then extends at the other side of the articulated axle. Although the tilted position has then been reached a further small swivelling angle may be provided for the link to be stopped to account for varying parts tolerances.

This basic idea of the invention is based on the reciprocal effect of the tension spring which changes over the holding pin abruptly, but after changing over the holding pin directly acts upon the link in a changed sense, could be realized in such a way that the holding pin is adjusted along a segment of a circular path rather than a straight line.

The invention can also be realized according to the principle of the initially mentioned prior publication, if an arc-shaped longitudinal hole is provided in the fastening member instead of a straight longitudinal hole. A construction having a swivellable rocker is preferred because the guidance of the holding pin via a swivellable rocker can be effected more easily and operates with less trouble.

BRIEF DESCRIPTION OF THE DRAWING

The invention will be better understood from a reading of the following detailed description in conjunction with the drawing in which:

FIG. 2 is a partial section through a second embodiment of a wiper arm; and

FIG. 3 is a view in the direction of arrow P on the embodiment according to FIG. 2.

DETAILED DESCRIPTION

Figure 1:
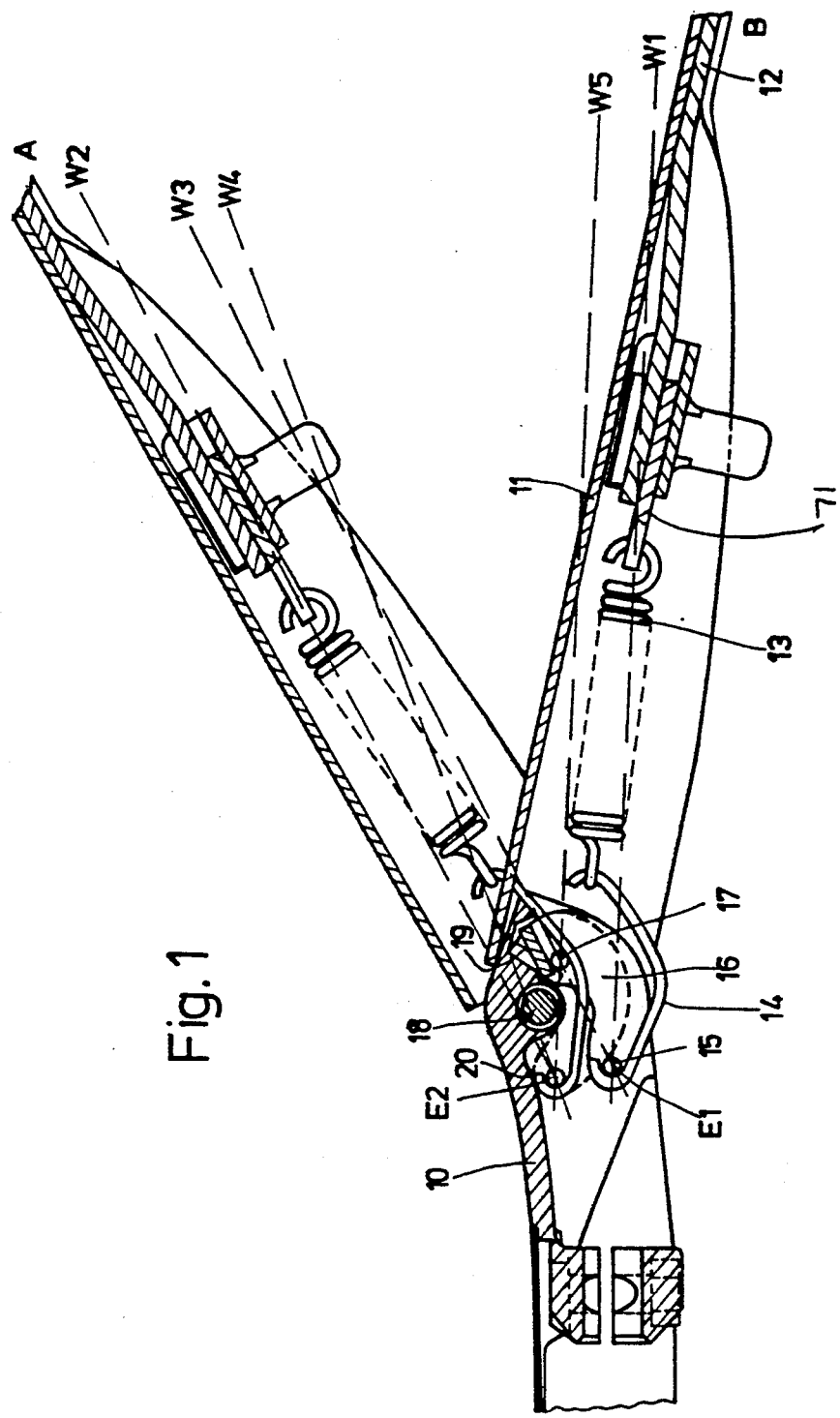
FIG. 1 is partial longitudinal section through a first embodiment of a wiper arm.

The wiper arm according of FIG. 1 includes a fastening member 10 coupleable to a windshield wiper drive means (not shown) and a link 11 which is swivellably articulated to the fastening member. Onto the link 11 a wiper rod 12 is fixed in a known manner, which wiper rod is only shown partially. A wiper blade is swivellably mounted and guided on wiper rod 12 in conventional fashion. The necessary contact pressure of this wiper blade on the window pane to be cleaned is produced by a spring element in the shape of a tension spring 13, which is suspended in conventional manner at the wiper rod 12 in an aperture of a holding pin 71 and thus indirectly acts upon the link 11. At the other end this tension spring 13 is suspended in a C-yoke 14 which acts upon a holding pin 15. This holding pin 15 is fixed onto a rocker 16, which is swivellably mounted on the fastening member 10 via a pivot pin 17. Thus this tension spring 13 acts upon the fastening member 10 indirectly.

In FIG. 1 link 11 is shown in its operation position B and in its tilted position A. In the operating position B the action line W1 of the tension spring runs below the articulated axle 18 between link 11 and fastening member 10. Consequently link 11 is swivelled by tension spring 13 in a clockwise direction of rotation and thus the wiper blade is pressed against the window pane to be cleaned. Rocker 16 occupies the position indicated by unbroken lines, wherein it abuts a stop 19 on the fastening member 10. The holding pin occupies its first end position E1.

Because of the swivellable support of rocker 16, holding pin 15 can be changed over into its second end position E2. This end position E2 is occupied by the holding pin 15 in the tilted position A of the link 11. Then the action line W2 runs above the articulated axle 18, so that now the tension spring 13 acts upon the link 11 in counterclockwise direction and holds this link in its stable tilted position, in which it rests upon a stop (not shown in detail) of the fastening member 10.

The tilting action of the link 11 from the operating positon into the stable tilted position is described below. If the link 11 is swivelled in counterclockwise direction, the action line of the tension spring 13 is also swivelled in the same sense of rotation. Thereby the tension spring is stressed increasingly. Finally the link 11 occupies such an angular position that the action line W3 of the tension spring 13 cuts the pivot pin 17 of the rocker 16. In this moment the tension spring is maximally prestressed. If, starting from this position, the link is further swivelled in counterclockwise direction a small angular amount, action line W3 crosses the pivot pin 17, so that the tension spring 13 acts upon the rocker 16 such that rocker 16 and thus also the holding pin 15 is abruptly changed over into its second end position E2. Thereby the action of the tension spring 13 is also changed. The new action line W4 lies at the other side of the articulated axle 18 between fastening member and link, so that spring element 13 now automatically brings the link 11 into its tilted position A.

Thus the basic idea of the present invention can be clearly seen from this description. This basic idea is that in a swivelling motion of the link from the operating position into the tilted position the holding pin is abruptly changed over into its second end position, whereby—and this is of particular importance—by this abrupt changeover of the holding pin the action line of the tension spring is displaced from one side to the other side of the articulated axle.

The resetting of link 11 into the operating position is described below. For this purpose link 11 is swivelled in clockwise direction with the tension spring 13 intially tensioned. If thereby the action line of the tension spring crosses the articulated axle 18, link 11 is prestressed by tension spring 13 towards the window pane to be cleaned. However holding pin 15 initially retains its second end position E2 until spring element 13 occupies the action line W5 which runs through the pivot pin 17 of rocker 16. If link 11 is further swivelled the tension spring 13 draws the rocker 16 into its other end position E1.

In the embodiment of FIG. 1 holding pin 15 is adjustable along a segment of a circular path. The end area of this segment of a circular path is defined by the end position of the holding pin 15. In order to achieve the intended effect this segment of a circular path must be arranged in particular relation to the articulated axle 18. It is essential that the action line W5 through the articulated axle 18 and the holding pin 15 in its second end position E2 lies in the angular range between the action line W1 of the tension spring in the operating position and the action line of the tension spring in the tilted position. If this were not so rocker 16 and thus also the holding pin 15 could no longer be automatically reset from its second end position E2 into the first end position E1. This would have the consequence that the wiper blade would rest upon the window pane to be cleaned with an insufficient contact pressure. Furthermore, rocker 16 is swivellably mounted on the fastening member 10 and points in the opposite direction of link 11. The swivelling motion of this rocker is limited by stops 19 and 20 on the fastening member.

In the embodiment of FIG. 2 the C-yoke 14 has a stud 30, which in the swivelling motion of link 11 from the operating position into the tilted position rests against the fastening member 10 with its end area at 31. This point of contact serves in effect as a point of rotation for yoke 14, so that in the return swivelling motion of the link 11, the holding pin 15 is adjusted in a direction towards its first end position E1. Thereby an earlier changeover of the rocker 16 is achieved.

From FIG. 3 it can be seen that two tension springs 13, 13' spaced from each other are provided between fastening member 10 and link 11. There are two rockers 16, 16' of which each has a holding pin 15, 15', into which corresponding C-yokes 14, 14' are suspended. The two rockers 16, 16' are interconnected via a bridge 40, whose width D is selected in such a way that the two rockers 16, 16' rest against the side walls 41-41' of the fastening member 10. These two rockers 16, 16', the bridge 40 and the holding pins 15, 15' are integrally made of a sheet metal part. In this construction it is also essential that the rockers 16, 16' are swivellably mounted in the side walls 41, 41' of the fastening member 10 via one holding pin 45, 45' each, whereby these bearing pins 45, 45' penetrate the side walls 41, 41' of the fastening member 10 and dip into bearing bores 46, 46' of the rocker, but do not protrude from these bearing bores. The C-yoke 14, 14' can then—as seen in FIG. 2—dip into the area between the two bearing pins 45 which opens up the possibility of giving these C-yokes a flatter shape. In contrast thereto in the construction of FIG. 1 the bearing pin 17 is formed as a through rod, so that the C-yoke 14 must be curved more. Thus, as a whole, the overall height of the wiper arm is reduced by a construction according to FIG. 2.

In accordance with the invention a wiper arm is provided in which a small swivelling angle is sufficient to swivel the link from the operating position into a stable tilted position. Thus a wiper arm of this kind is particularly suitable for wiper systems with a so-called submerged parking position.

What is claimed is:

1. A windshield wiper arm comprising:
   a fastening member coupleable to a windshield wiper means;
   a link swivellably mounted on said fastening member by means of an articulated axle and serving as a guide for a wiper blade;
   a spring element coupled at one end to said link and coupled at its other end to a holding pin, said holding pin guided on said fastening member by a rotatable rocker member, said spring element acting upon said link such that when said link is in an operating position said holding pin guided on said rocker member is in a first position wherein the action line of said spring element lies on one side of said articulated axle so that said spring element stresses said link towards the window pane to be cleaned;

said rocker arm being sufficiently rotatable to enable said holding pin guided on said rocker arm to change from said first position to a second position when said link is moved from said operating position to a tilted position, said changing of said holding pin from said first position to said second position causing the action line of said spring element to be on the other side of said articulated axle so that said spring element stresses said link away from said window pane.

2. a wiper arm in accordance with claim 1, wherein:

said holding pin is adjustable along a segment of a circular path, the end areas of said path defining said first and second positions;

said segment arranged relative to said articulated axle such that the action line of said spring element through the center of said segment and said holding pin in its second position lies in an angular range defined by said action lines of said spring element when said link is in said operating and tilted positions.

3. A wiper arm in accordance with claim 2, wherein said rocker is swivellably mounted on said fastening member and points in the opposite direction of said link; and a plurality of stops for limiting the swivelling motion of said rocker.

4. A wiper arm in accordance with claim 3, comprising:

a C-shaped yoke coupling said spring element to said holding pin.

5. A wiper arm in accordance with claim 4, wherein:

said yoke comprises a stud, said stud contacting said fastening member when said link is swivelled from said tilted position to said operating position, the point of contact of said stud on said fastening member acts as a center of rotation for said yoke such that when said link is reset from said tilted position said holding pin is continuously adjusted in a predetermined angular range towards said first position.

6. A wiper arm in accordance with claim 5, wherein:

said spring element comprises first and second spaced apart tension springs;

said wiper arm comprising:

first and second rockers swivellably mounted on said fastening member and pointing in the opposite direction of said link;

a plurality of stops for limiting motion of said rocker;

said holding pin being carried on said first rocker;

a second holding pin carried on said second rocker;

a first C-shaped yoke coupling said first spring and said first holding pin;

a second C-shaped yoke coupling said second spring and said second holding pin; and a bridge interconnecting said first and second rockers, said bridge having a width such that said first and second rockers rest against side walls of said fastening member.

7. A wiper arm in accordance with claim 6, comprising:

first and second pivot pins coupling said fastening member side wall to said first and second rockers, respectively.

* * * * *